N. WESTON.

Improvement in Apparatus for Enamelling Photographic Pictures.

No. 5,085. Reissued Oct. 1, 1872.

Side View.

Top View.

Inventor.

Witnesses

J. H. Atkinson

John D. Rethmann.

Nathaniel Weston

AM. PHOTO-LITHOGRAPHIC CO. N.Y. (OSBORNE'S PROCESS.)

UNITED STATES PATENT OFFICE.

NATHANIEL WESTON, OF SAN FRANCISCO, CALIFORNIA.

IMPROVEMENT IN APPARATUS FOR ENAMELING PHOTOGRAPHIC PICTURES.

Specification forming part of Letters Patent No. 72,138, dated December 10, 1867; reissue No. 5,085, dated October 1, 1872.

*To all whom it may concern:*

Be it known that I, NATHANIEL WESTON, of the city and county of San Francisco, State of California, have invented a new and useful Improvement in Enameling Cards of Photographed Pictures; and I do hereby declare that the following is a full and exact description thereof, reference being had to the accompanying drawing and to the figures and letters of reference marked thereon.

This improvement consists in using two glass plates in enameling pictures instead of one glass plate, as heretofore; also, in using a rest, against which the top glass plate is placed while pressing it down for the purpose of evenly distributing the enamel; and, furthermore, in the employment of clamps for holding the glass plates until the enamel is sufficiently set to be put aside to dry, as will be fully described hereinafter.

Figure 1:
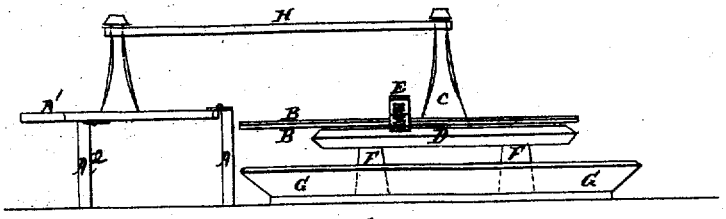
Figure 2:
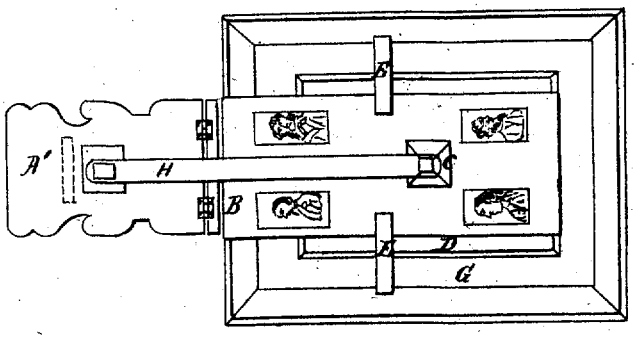

In the drawing, Figure 1 represents a side elevation of an apparatus adapted to be used in my method of enameling; and Fig. 2, a plan view of the same.

A, Fig. 1, represents the upright portion of the rest, which is secured in place in any proper manner, and to which is pivoted the horizontal part $A^1$, having the hinged support $A^2$, as shown. The precise construction of this rest is not essential; nor is it important to have it made of any peculiar material. G, Figs. 1 and 2, represents a dish of suitable size, in which are placed four tapering blocks, F F, which support the enameling-block D. B B represent two glass plates, and E E the clamps, by means of which the plates are held together.

The method of using this apparatus is as follows: The enameling-block D is placed upon the supports F located in the tray G, and upon the block D are placed the glass plates B B with the photograph between them, having the enamel or gluten properly applied, the edge of the upper glass plate being held squarely and firmly against the upright portion of the rest while it is being pressed downward by the hands of the operator. By this means the enamel is evenly distributed. The clamps being applied, the plates are held until the enamel has set sufficiently to permit their removal.

The method described is especially advantageous, as it permits much more rapid work to be done than is possible with the old method. Air-spots and blisters are avoided, and a beautiful finish is given to the picture.

Having thus fully described my invention, what I claim as new, and desire to secure by Letters Patent, is—

The method of enameling described, consisting in the employment of the two plates B B, the rest $A^1$, and the clamps E E, substantially as described.

NATHANIEL WESTON.

Witnesses:

HENRY B. JANES,
WILLIAM HIGBY.